United States Patent
Leugs et al.

(10) Patent No.: US 6,288,162 B2
(45) Date of Patent: *Sep. 11, 2001

(54) CONTINUOUS PROCESS FOR PREPARING POLYMER BASED PIGMENT PREPARATIONS

(75) Inventors: Johannes Leugs, Geleen (NL); Harald Marinus Alexander Heere, Landshut (DE); Adrianus Hendrikus Van Rooijen, Ulestraten (NL)

(73) Assignee: CIBA Specialty Chemicals Corp., Tarrytown, NY (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/267,584

(22) Filed: Mar. 12, 1999

(30) Foreign Application Priority Data

Mar. 17, 1998 (EP) .................................................. 98104766

(51) Int. Cl.⁷ .................................................... C08L 33/06
(52) U.S. Cl. ........................................ 524/560; 526/329.7
(58) Field of Search .......................... 524/560; 526/329.7

(56) References Cited

U.S. PATENT DOCUMENTS

| | | | |
|---|---|---|---|
| 3,637,545 | 1/1972 | Fivel | 260/4 |
| 4,620,993 | * 11/1986 | Suss et al. | 427/407.1 |
| 5,344,489 | * 9/1994 | Matijevuc et al. | 106/422 |
| 5,710,197 | 1/1998 | Fischer et al. | 524/82 |
| 5,905,111 | * 5/1999 | Leugs et al. | 524/560 |

FOREIGN PATENT DOCUMENTS

| | | |
|---|---|---|
| 0022746 | 1/1981 | (EP) . |
| 0456610 | 11/1991 | (EP) . |
| 0542669 | 5/1993 | (EP) . |
| 2216335 | 8/1974 | (FR) . |

OTHER PUBLICATIONS

Derwent Abstr. 74–58791V for FR 2216335.

* cited by examiner

*Primary Examiner*—David W. Wu
*Assistant Examiner*—Tanya Zalukaeva
(74) *Attorney, Agent, or Firm*—David R. Crichton

(57) ABSTRACT

Preparing pigment preparations by mixing a dyestuff with a monomer and simultaneously polymerizing the monomers in an extruder at elevated temperatures, wherein the following steps are carried out:

(A) introducing continuously into an extruder
 (a) from 40 to 90% by weight of a pigment,
 (b) from 60 to 10% by weight of a monomer or a monomer mixture, and
 (c) from 0.01 to 10% by weight, related to the amount of monomer component (b), of an initiator or a mixture of initiators, and
 (d) from 0 to 10% by weight, related to the amount of monomer component (b), of a chain transfer agent,
 whereby the amounts of the pigment and the monomer or monomer mixture sum up to 100%, and whereby the monomer component (b) is admixed with either the initiator or mixture of initiators (c), or the chain transfer agent (d), or the initiator or initiator mixture (c) and the chain transfer agent (d), before it is introduced into the extruder, (B) simultaneously mixing the components (a) to (c), as well as (d) if present, and polymerizing the monomer or copolymerizing monomer mixture within the extruder, and (C) withdrawing continuously the obtained reaction mixture from the extruder, pigment preparations, high molecular weight organic material pigmented therewith as well as the method of use thereof.

5 Claims, No Drawings

CONTINUOUS PROCESS FOR PREPARING POLYMER BASED PIGMENT PREPARATIONS

The present invention relates to an improved process for preparing pigment preparations by mixing a with a monomer and simultaneously polymerizing the monomers in an extruder at elevated temperatures.

In view of the strong tendency towards improved industrial hygiene, customers are more and more switching from powder pigments towards the use of pigment preparations. Pigment preparations however, do consist of pigment on the one hand and a carrier material on the other. Consequently, by using pigment preparations, carrier material together with the pigment are introduced into the applications system. In order to minimise possible effects of the carrier material in the end application, its concentration should be as low as possible, or, in other words, the pigment concentration should be as high as possible, while maintaining optimal dispersion properties.

In general the manufacturing processes for pigment preparations use ready-made polymers and ready-made pigments as raw materials and then disperse the pigment into the polymer material. The production process essentially consists of two steps, the separate manufacturing of the polymer material followed by pigment dispersion. EP-A 456 610 and EP-A 542 669 describe a process for the manufacture of pigment preparations comprising up to 10% by weight of a colored composition but all in polycondensation resins, such as thermoset crosslinked resins (bulk condensation of a sulphonamide with an aldehyde) and polyamide, polyester, polycarbonate or polyurethane resins respectively, whereby the reactants (monomers) for the formation of said polycondensation resin are introduced continuously together with the colored composition into an extruder and polymerised therein at elevated temperatures. A major drawback of these processes is the fact that only up to 10% of a colored composition can be incorporated into the polycondensation resins. A further drawback is, that the polydispersity $M_w/M_n$ is too high, because for a lot of applications a narrow distribution is preferred. For some applications, too, polymers with low molecular weights are desired.

Hence, the object of this invention was to provide a process yielding pigment preparations which contain more than 10% of pigment and exhibit an improved polydispersity. In addition, pigment preparations should be provided wherein the polymers do have a low molecular weight.

Accordingly, an improved process for preparing pigment preparations by mixing a dyestuff with a monomer and simultaneously polymerizing the monomers in an extruder at elevated temperatures has been found, wherein the process essentially consists of the following steps:

(A) introducing continuously into an extruder
  (a) from 40 to 90% by weight of a pigment,
  (b) from 60 to 10% by weight of a monomer or a monomer mixture, and
  (c) from 0.01 to 10% by weight, related to the amount of monomer component (b), of an initiator or a mixture of initiators, and
  (d) from 0 to 10% by weight, related to the amount of monomer component (b), of a chain transfer agent, whereby the amounts of the pigment and the monomer or monomer mixture sum up to 100%, and whereby the monomer component (b) is admixed with either the initiator or mixture of initiators (c), or the chain transfer agent (d), or the initiator or initiator mixture (c) and the chain transfer agent (d), before it is introduced into the extruder, (B) simultaneously mixing the components (a) to (c), as well as (d) if present, and polymerizing the monomer or copolymerizing monomer mixture within the extruder, and (C) withdrawing continuously the obtained reaction mixture from the extruder.

In addition, new pigment preparations, a high molecular weight organic material pigmented with the inventive pigment preparation and its use were found, too.

According to the inventive process, the monomer component (b) is admixed with either
  the initiator or mixture of initiators (c),
  or the chain transfer agent (d),
  or the initiator or initiator mixture (c) and the chain transfer agent (d), before it is introduced into the extruder. Preferably the monomer is admixed with the initiator or mixture of initiators (c), or the initiator or initiator mixture (c) and the chain transfer agent (d), most preferred the monomer component (b) is admixed with the initiator or initiator mixture (c) and the chain transfer agent (d).

The admixture can be carried out by known methods e.g. by mixing the components in usual vessels and agitators, static mixers etc.

If the initiator or mixture of initiators (c) is admixed with the monomer component (b) with or without the chain transfer agent (d), it is preferred to cool the admixture after it is admixed, especially if it is desired to store it, usually at a temperature in the range of from −30 to 5° C, preferably from −20 to −5° C.

Pigments which can be used according to the instant invention are any of the solid colorants normally used in the industry for the coloring of high molecular organic material. These include organic pigments and inorganic pigments as well as carbon black. Typical organic pigments are those of the quinacridone, diketopyrrolopyrrole, anthraquinone, perylene, indigo, quinophthalone, isoindolinone, isoindoline, dioxazine, phthalocyanine or azo series, or a mixture thereof.

Examples of suitable inorganic pigments are metal oxide pigments, such as iron oxide, titanium oxide and chromium oxide, cadmium pigments, such as cadmium sulfide, bismuth pigments, such as bismuth vanadate, chromate pigments, such as lead chromate, molybdate pigments, such as lead molybdate, and the like, or a mixture thereof. Mixtures of all kinds of pigments can also be used.

The amount of pigment to be introduced into the extruder is chosen in the range of from 40 to 90, preferably from 40 to 80, more preferably from 45 to 80, most preferably from 45 to 75% by weight, based on the total amount of introduced pigment and monomer(s).

Accordingly, the amount of pigment in the inventive pigment preparation usually—depending inter alia on the degree of polymerization—is within the range of from 40 to 90, preferably from 50 to 75, and in some cases it can be as high as from 60 to 75% by weight, based on the total composition.

According to the inventive process the monomer or monomer mixture is selected from the group consisting of an acrylate or methacrylate of the formula I $$CH_2=CR_1-COOR_2 \qquad (I)$$

wherein $R_1$ is hydrogen or methyl, and $R_2$ is hydrogen, $C_1$–$C_{12}$ alkyl, $CH_2-CH_2-N(R_3)(R_4)$, $CH_2-CH=CH_2$, $CH_2CF_3$, $CH_2-CH_2OR_3$, or $CH_2-CHOH-R_3$, $R_3$ and $R_4$ independently of each other are hydrogen or $C_1$–$C_4$ alkyl, and acrylonitril, acrylamide, styrene, vinylacetate, and vinyl alcohol, whereby the term "monomer" in the context of this application encompasses also prepolymers, e.g. oligomers, i.e. polymerizable compounds with a molecular weight of usually not higher than 1,000 g/mol.

In a preferred embodiment of this invention, acrylate and/or methacrylate monomers of the formula I $$CH_2=CR_1—COOR_2 \quad (I)$$

wherein $R_1$ is hydrogen or methyl $R_2$ is hydrogen, $C_{1-12}$ alkyl, $CH_2—CH_2—N(R_3)(R_4)$, $CH_2—CH=CH_2$, $CH_2CF_3$, $CH_2—CHOH—R_3$, $R_3$ and $R_4$ independently of each other are hydrogen or $C_1-C_4$ alkyl, as well as acrylonitril, acrylamide, styrene, vinylacetate, vinyl alcohol, or mixtures thereof, are preferred.

Suitable $C_1-C_{12}$ alkyl groups are methyl, ethyl, n-propyl, isopropyl, n-butyl, sec.-butyl, i-butyl, tert.-butyl, amyl, hexyl, heptyl, octyl, 2-ethylhexyl, nonyl, decyl or dodecyl, preferably $C_1-C_4$ alkyl such as methyl, ethyl, n-propyl, isopropyl, n-butyl, sec.-butyl, i-butyl or tert.-butyl, more preferably methyl, ethyl and n-butyl.

If desired, prepolymers obtained from the above-mentioned monomers can be used, too.

Preferred acrylate monomers are those of formula I, wherein $R_1$ is hydrogen or methyl and $R_2$ is $C_1-C_4$ alkyl, or a mixture thereof.

A preferred embodiment of this invention uses mixtures of methylmethacrylate ("MMA") and n-butylacrylate ("BA"), methylmethacrylate and styrene ("S"), and methylmethacrylate and n-butylacrylate and acrylic acid ("AA"). Mixtures of MMA/S usually contain from 90 to 60% b.w. MMA and from 10 to 40% S, and mixtures of MMA/BANAA usually contain from 50 to 80% b.w. MMA, 10 to 40% b.w. BA and from 5 to 30% M, the total amounts always sum up to 100%.

Particularly preferred are mixtures of methylmethacrylate and butylacrylate, preferably from 40 to 80% b.w. of MMA and from 60 to 20% b.w. of BA, more preferably from 50 to 75% b.w. of MMA and from 50 to 25% b.w. of BA, most preferably from 60 to 75% b.w. of MMA and from 40 to 25% b.w. of BA, the total amounts always sum up to 100%.

The amount of monomer component (b) is within the range of from 60 to 10, preferably from 50 to 25, and in some cases it can be as low as from 40 to 25% by weight, based on the total composition. Accordingly, the amount of polymer in the inventive pigment preparation usually is within the range of 60 to 10, preferably from 50 to 25, and in some cases it can be as low as from 40 to 25% by weight, based on the total composition, depending inter alia on the degree of polymerization.

The initiators to be used for the present invention in general are the initiators commonly used for polymerisations e.g. peroxydes, peresters, hydroperoxydes and some azo compounds and also mixtures thereof.

Preferred initiators are selected from the group consisting of tert.-butyl peroxyneodecanoate (TBPND), tert.-butylperoxyethylhexylcarbonate (TBPEHC) tert.-amylperoxyneodecanoate (TAPND), tert.-amylperoxypivalate (TAPPI), tert.-butylperoxypivalate (TBPPI), 2,5-dimethyl-2,5-di(2-ethylhexanoylperoxy) hexane (DHPEH), tert.-amylperoxy-2-ethylhexanoate (TAPEH), tert.-butylperoxy-2-ethylhexanoate (TBPEH), tert.-butylperoxy-3,5,5-trimethylhexanoate (TBPIN) and mixtures thereof.

Particularly preferred are mixtures of tert.-butylperoxyneodecanoate and tert.-butylperoxyethylhexylcarbonate, preferably chosen in the range of from 50 to 90% b.w. TBPND and 50 to 10% b.w. TBPEHC, the total sum being 100%, especially preferred is a weight ratio of in the range of from (70 to 80)/(30 to 20) (TBPND/TBPEHC).

The amount of initiator or mixture of initiators usually is chosen in the range of from 0.01 to 10%, preferably from 2 to 8% and most preferably 3 to 6% by weight, based on the monomer or monomer mixture.

In a preferred embodiment of this invention a chain transfer agent, component (d) is used in amounts preferably in the range of from 0.01 to 10, more preferred from 0.1 to 5, most preferred from 1 to 4% by weight, related to the amount of monomer component (b). As chain transfer agents, or also commonly known as molecular weight regulators, all known compounds such as primary $C_{1-15}$ alkyl mercaptans like n-butyl mercaptan, sec.-butyl mercaptan, tert.-butyl mercaptan, n-dodecyl mercaptan, i-dodecyl mercaptan, tert.-dodecyl mercaptan, preferred are n-butyl mercaptan, sec.-butyl mercaptan, tert.-butyl mercaptan, n-dodecyl mercaptan and tert.-dodecyl mercaptan, can be used. In addition, solvents such as organic solvents such as halogenated hydrocarbons like tetrachloro methane, ethers like tetrahydrofurane, ketones like methylisobutyl ketone, aromatic hydrocarbons such as benzene, toluene, xylene can be used as chain transfer agents, too.

If desired, the usual additives and fillers such as crystal growth inhibitors usually in amounts in the range of from 0.01 to 15% by weight, related to the total amount of reactants, rheology improvers usually in amounts ranging from 0.01 to 15% by weight, related to the total amount of reactants, dispersants usually in amounts in he range of from 0.01 to 30% by weight, related to the total amount of reactants, and stabilizers and antioxidants in effective amounts may be added.

As a rule, the reaction temperature usually should be chosen sufficiently high to ensure that the polymerization reaction takes place in a reasonable time. In general, this depends of course from the chosen reactants, but can be figured out easily by a person skilled in the art, because the corresponding data are well-known in the art. As a rule, the reaction can be carried out at from 70 to 220° C., preferably from 90 to 200° C. Especially, in the case where MMA and BA are to be polymerized the reaction can be carried out at a temperature in the range of from 100 to 170° C.

Usually, the reaction time depends on the chosen reactants, the desired molecular weight of the polymer to be produced, the chosen reaction temperature, etc. Suitable reaction times can be found easily by a person skilled in the art, if necessary by a few pilot tests. As an example, in case a MMA/BA mixture (7:3) and a diketopyrrolopyrrol as pigment, the reaction time usually is within the range of 0.1 to 2 hours, if the reaction temperature is within the range of from 50 to 150° C.

Usually, any kind of extruder can be used, e.g. twin-screw extruders or kneading extruders, but co-rotating twin-screw extruders and especially co-rotating, closely intermeshing extruders are preferred.

The general procedure using an extruder is known, and described e.g. in The Canadian Journal of Chemical Engineering, 71, June 1993 and U.S. Pat. No. 3,637,545.

In a more preferred embodiment a co-rotating twin-screw extruder is used with a L/D (length/diameter) ratio in the range of from 30 to 60, particularly from 40 to 60. Usually, the throughputs in the extruder depend on the different reactants and, of course, on the size of the extruder. For example, the throughput is preferably chosen in the range of from 0.1 to 10, more preferred from 1 to 8 kg/h.

In a preferred embodiment of this invention, a temperature profile is applied to different zones of the used extruder depending on the chosen pigment and monomer. Preferred e.g. is a temperature profile in which (a) in approximately within the first quarter of the extruder ($0 \leq x < 0.25L$) the temperature is chosen at a range from ambient temperature to about two third of the desired highest temperature, (b) in the second quarter of the extruder ($0.25L \leq x < 0.5L$) the temperature usually is increased to 100% of the desired highest temperature, (c) in the third quarter of the extruder ($0.5L \leq x < 0.75L$) the temperature is in the range of 100 to 80% of the desired highest temperature, preferably the temperature is decreased at the end of this part of the extruder to 80 to 90% of the desired highest temperature, (d) in the last quarter of the extruder ($0.75L \leq x < L$) at the beginning of this part of the extruder the temperature preferably is chosen at about 80 to 90% of the desired highest temperature and then, in the following parts of the extruder, is increased to about 100 to 120% of the highest desired temperature chosen in the second part of the extruder (b).

In other preferred embodiments the zone of the extruder with the desired highest temperature (see above part (b)) can be extended, preferably in combination with the overall length L of the extruder, and, of course, more detailed profiles can be chosen, usually depending on the chosen pigments, monomers, initiators, and chain transfer agents.

According to the invention, the reaction mixture is withdrawn continuously from the extruder by known methods, e.g. it is usually released into air and/or water at ambient temperature and atmospheric pressure. If desired, further work-up can be carried out such as granulating or pulverizing by known methods to yield granules, powders or pastes, if the powder is mixed with an organic solvent or water.

Another embodiment of the present invention is related to the use of the inventive prepared pigment preparations for the preparation of coloring high molecular weight organic materials (usually having a molecular weight in the range of $10^5$ to $10^7$ g/mol), e.g. biopolymers, plastic materials, including fibers, glasses, ceramic products, for formulations in decorative cosmetics, for the preparation of inks, printing inks, paint systems, in particular automotive lacquers and photoresists, photo- and electroconductive polymers, fluorescent whitening agents, photocell aggregates, colored photoresists, color filters and dispersion colors and, furthermore, the inventive prepared pigment preparations can be used in the biomedical field of application, e.g. for the preparation of diagnostic agents as well as in the fields of impact-printing and non-impact-printing and photo/repro in general.

Illustrative examples of suitable organic materials of high molecular weight which can be colored with the inventive prepared pigment preparations of this invention are vinyl polymers, for example polystyrene, poly-a-methylstyrene, poly-p-methylstyrene, poly-p-hydroxystyrene, poly-p-hydroxyphenylstyrene, polymethyl methacrylate and polyacrylamide as well as the corresponding methacrylic compounds, polymethylmaleate, polyacrylonitrile, polymethacrylonitrile, polyvinyl chloride, polyvinyl fluoride, polyvinylidene chloride, polyvinylidene fluoride, polyvinyl acetate, polymethyl vinyl ether and polybutyl vinyl ether; polymers which are derived from maleinimide and/or maleic anhydride, such as copolymers of maleic anhydride with styrene; polyvinyl pyrrolidone; ABS; ASA; polyamides; polyimides; polyamidimides; polysulfones; polyether sulfones; polyphenylene oxides; polyurethanes; polyureas; polycarbonates; polyarylenes; polyarylene sulfides; polyepoxides; polyolefins such as polyethylene and polypropylene; polyalkadienes; biopolymers and the derivatives thereof e.g. cellulose, cellulose ethers and esters such as ethylcellulose, nitrocellulose, cellulose acetate and cellulose butyrate, starch, chitin, chitosan, gelatin, zein; natural resins; synthetic resins such as alkyd resins, acrylic resins, phenolic resins, epoxide resins, aminoformaldehyde resins such as urea/formaldehyde resins and melamine/formaldehyde resin; vulcanized rubber; casein; silicone and silicone resins; rubber, chlorinated rubber; and also polymers which are used, for example, as binders in paint systems, such as novolaks which are derived from $C_{1-6}$-aldehydes such as formaldehyde and acetaldehyde and a binuclear or mononuclear, preferably mononuclear, phenol which, if desired, is substituted by one or two $C_1$–$C_9$alkyl groups, one or two halogen atoms or one phenyl ring, such as o-, m- or p-cresol, xylene, p-tert.-butylphenol, o-, m- or p-nonylphenol, p-chlorophenol or p-phenylphenol, or a compound having more than one phenolic group such as resorcinol, bis(4-hydroxyphenyl)methane or 2,2-bis(4-hydroxyphenyl)propane; as well as suitable mixtures of said materials.

Particularly preferred high molecular weight organic materials, in particular for the preparation of a paint system, a printing ink or ink, are, for example, cellulose ethers and esters, e.g. ethylcellulose, nitrocellulose, cellulose acetate and cellulose butyrate, natural resins or synthetic resins (polymerization or condensation resins) such as aminoplasts, in particular urea/formaldehyde and melamine/formaldehyde resins, alkyd resins, phenolic plastics, polycarbonates, polyolefins, polystyrene, polyvinyl chloride, polyamides, polyurethanes, polyester, ABS, ASA, polyphenylene oxides, vulcanized rubber, casein, silicone and silicone resins as well as their possible mixtures with one another.

It is also possible to use high molecular weight organic materials in dissolved form as film formers, for example boiled linseed oil, nitrocellulose, alkyd resins, phenolic resins, melamine/formaldehyde and urea/formaldehyde resins as well as acrylic resins.

Said high molecular weight organic compounds may be obtained singly or in admixture, for example in the form of granules, plastic materials, melts or in the form of solutions, in particular for the preparation of spinning solutions, paint systems, coating materials, inks or printing inks.

In a particularly preferred embodiment of this invention, the inventive prepared pigment preparations are used for the mass coloration of polyvinyl chloride, polyamides and, especially, polyolefins such as polyethylene and polypropylene as well as for the preparation of paint systems, including powder coatings, inks, printing inks, color filters and coating colors.

Illustrative examples of preferred binders for paint systems are alkyd/melamine resin paints, acryl/melamine resin paints, cellulose acetate/cellulose butyrate paints and two-pack system lacquers based on acrylic resins which are crosslinkable with polyisocyanate.

According to observations made to date, the inventive prepared pigment preparations can be added in any desired amount to the material to be colored, depending on the end use requirements. In the case of high molecular weight organic materials, for example, the pigments preparations prepared according to this invention can be used in an amount in the range from 0.01 to 40, preferably from 0.1 to 20% by weight, based on the total weight of the colored high molecular weight organic material.

Hence, another embodiment of the present invention relates to a composition comprising of
- (a) 0.01 to 40, preferably 0.1 to 20% by weight, based on the total weight of the colored high molecular organic material, of a pigment preparation prepared according to the present invention, and
- (b) 99.99 to 60, preferably 99.9 to 80% by weight, based on the total weight of the colored high molecular organic material, of a high molecular organic material, and
- (c) if desired, customary additives such as rheology improvers, dispersants, fillers, paint auxiliaries, siccatives, plasticizers, UV-stabilizers, and/or additional pigments or corresponding precursors in effective amounts, such as e.g. from 0 to 50% b.w., based on the total weight of (a) and (b).

The pigmenting of the high molecular weight organic materials with the inventive prepared pigment preparations usually is effected by incorporating said inventive prepared pigment preparations, if desired in the form of masterbatches, in the high molecular weight organic materials using customary apparatus suitable to this end, such as extruders, roll mills, mixing or milling apparatus. The material thus treated is then normally brought into the desired final form by methods which are known per se, such as calandering, molding, extrusion molding, coating, casting, extruding, by injection molding.

To produce non-brittle moldings or to diminish their brittleness, so-called plasticizers can be added to the high molecular weight substances prior to molding. Plasticizers may be, for example, esters of phosphoric acid, phthalic acid and sebacic acid. Said plasticizers may be added before, during or after pigmenting the high molecular weight substances with the inventive prepared pigment preparations.

To obtain different shades, the inventive prepared pigment preparations may advantageously be used in admixture with fillers, transparent and opaque white, colored and/or black pigments as well as customary luster pigments in the desired amount.

For the preparation of paints systems, coating materials, color filters, inks and printing inks, the corresponding high molecular weight organic substances, such as binders, synthetic resin dispersions etc. and the inventive prepared pigment preparations are usually dispersed or dissolved together, if desired together with customary additives such as dispersants, fillers, paint auxiliaries, siccatives, plasticizers and/or additional pigments or pigment precursors, in a common solvent or mixture of solvents. This can be achieved by dispersing or dissolving the individual components by themselves, or also several components together, and only then bringing all components together, or by adding everything together at once.

Hence, a further embodiment of the present invention relates to the use of the inventive prepared pigment preparations for the preparation of dispersions and the corresponding dispersions, and paint systems, coating materials, color filters, inks and printing inks comprising the inventive prepared pigment preparations.

For application in printing, all customary industrial printing processes can be employed, such as screen printing, rotogravure, bronze printing, flexographic printing and offset printing.

The inventive prepared pigment preparations exhibit better dispersibility, transparency and color strength compared to corresponding known compositions. Further, the process to obtain the inventive prepared pigment preparations is an easy, industrial applicable one-step process. The preparation consists of tailor-made carrier material in order to guarantee compatibility with paint, plastics and printing ink application systems of individual customers, instead of commercially available carrier materials of which wide compatibility is questionable. Transparent applications can be obtained by the use of the inventive prepared pigment preparations which show the outstanding fastness of pigments. In addition, no solvents are necessary in the inventive one-step process.

EXAMPLES

Monomers (after preparation cooled to $-20°$ C.), initiators (cooled to $-20°$ C.), and chain transfer agents (ambient temperature) are mixed by manually shaking and stirring and the obtained homogeneous mixture is stored in an atmosphere of nitrogen in a dosing vessel at a temperature in the range of $-15$ to $-5°$ C.

Example 1

Monomer Premixed with Initiator 10 kg of 1,4-diketo-3,6-di-(4-chlorophenyl)pyrrolo[3,4-c]pyrrol (IRGAZIN®DPP Red BO from Ciba Speciality Chemicals) and 6 kg of a monomer/initiator mixture (stored and stirred in a cooled dosing vessel (see above): consisting of 5.76 kg of a monomer mixture (methylmethacrylate (MMA)/n-butylacrylate (BA) with a weight ratio of 60:40 (MMA/BA) premixed with 0.24 kg of an initiator mixture (TBPND and TBPEHC with a weight ratio of TBPND/TBPEHC=70:30) are metered into a co-rotating twin screw extruder with U/L=52, whereby the throughput of the pigment is 3 kg/hr, and the throughput of the monomer/initiator mixture is 3 kg/hr.

The extruder is divided into 15 zones, including a transition flange and the die-head, all having the same length, and each zone is heated individually. The following temperature profile is applied (1=input zone, 15=output zone):

zone 1 2 3 4 5 6 7 8 9 10 11 12 13 14 15

T[°C.] 40 40 40 80 120 140 150 150 150 150 150 130 130 160 170

The screw speed is 300 rpm. The melt is degassed in zone 12 at a pressure of 5 mbar (absolute), and extruded and filtered in zone 15. The extrudate is collected in a container, broken and ground.

The Table below summarizes the results.

Example 2

Monomer Premixed with Chain Transfer Agent 10 kg of 1,4-diketo-3,6-di-(4-chlorophenyl)pyrrolo[3,4-c]pyrrol (IRGAZIN®DPP Red BO from Ciba Speciality Chemicals), 10 kg of a monomer/n-BuSH mixture (stored and stirred in a cooled dosing vessel (see above): consisting of 9.8 kg of a monomer mixture (methylmethacrylate (MMA)/n-butylacrylate (BA) with a weight ratio of 60:40 (MMA/BA) premixed (stirring for 5 minutes) with 0.2 kg of n-BuSH) and 3 kg of a cooled ($-10°$ C.) initiator mixture (weight ratio of TBPND/TBPEHC=70:30) are metered simultaneously into a co-rotating twin screw extruder (same as in example 1 and same extrusion parameters), whereby the throughput of the pigment is 3 kg/hr, the throughput of the monomer/n-BuSH mixture is 3 kg/hr, and the throughput of the initiator mixture is 0.12 kg/hr. The Table below summarizes the results.

Example 3

Monomer Premixed with Initiator and Chain Transfer Agent 10 kg of 1,4-diketo-3,6-di-(4-chlorophenyl)pyrrolo[3,4-c]pyrrol (IRGAZIN®DPP Red BO from Ciba Speciality Chemicals), and 6 kg of a monomer/n-BuSH/initiator mixture (stored and stirred in a cooled dosing vessel (see above): consisting of 5.64 kg of a monomer mixture (methylmethacrylate (MMA)/n-butylacrylate (BA) with a weight ratio of 60:40 (MMA/BA) premixed with 0.12 kg of n-BuSH and 0.24 kg of an initiator mixture (weight ratio of TBPND/TBPEHC=70:30)) are metered simultaneously into a co-rotating twin screw extruder (same as in example 1 and same extrusion parameters), whereby the throughput of the pigment is 3 kg/hr, the throughput of the monomer/n-BuSH/initiator mixture is 3 kg/hr, too. The Table below summarizes the results.

Comparative Example 1

10 kg of 1,4-diketo-3,6-di-(4-chlorophenyl)pyrrolo[3,4-c]pyrrol (IRGAZIN®DPP Red BO from Ciba Speciality Chemicals), 10 kg of a monomer mixture (stored and stirred in a cooled dosing vessel (see above), methylmethacrylate (MMA)/n-butylacrylate (BA) with a weight ratio of 60:40 (MMA/BA), 3 kg of an initiator mixture (weight ratio of TBPND/TBPEHC=70:30)) are metered separately, but simultaneously into a co-rotating twin screw extruder (same as in example 1 and same extrusion parameters), whereby the throughput of the pigment is 3 kg/hr, the throughput of the monomer mixture is 3 kg/hr, and the throughput of the initiator mixture is 0.12 kg/hr. The Table below summarizes the results.

Example 4

Example 1 is repeated, but a phthalocyanine (HELIOGEN®Grün K8730 from BASF; C.I. Pigment Green 7) is used instead of the IRGAZIN® pigment, further the temperature profile is as follows:

zone 1 2 3 4 5 6 7 8 9 10 11 12 13 14 15

T [° C.] 40 40 40 70 100 120 150 150 150 150 150 130 130 160 170

Example 5

Example 2 is repeated, but HELIOGEN®Grün K8730 is used instead of the IRGAZIN® pigment, the temperature profile is the same as in ex. 4.

Example 6

Example 3 is repeated, but HELIOGEN®Grün K8730 is used instead of the IRGAZIN® pigment, the temperature profile is the same as in ex. 4.

Comparative Example 2

Comp. Ex. 1 is repeated, but HELIOGEN®Grün K8730 is used instead of the IRGAZIN® pigment, the temperature profile is the same as in ex. 4.

Example 7

Monomer Premixed with Initiator 10 kg of 1,4-diketo-3,6-di-(4-chlorophenyl)pyrrolo[3,4-c]pyrrol (IRGAZIN® DPP Red BTR from Ciba Specialty Chemicals) and 8 kg of a monomer/initiator mixture (stored and stirred in a cooled dosing vessel, see above): consisting of 7.36 kg of a monomer mixture (methylmethacrylate (MMA)/styrene (S) with a weight ratio of 80:20 (MMA:S), premixed with 0.64 kg of an initiator mixture (TBPND and TBPEHC with a weight ratio of TBPND:TBPEHC=70:30) are metered into a co-rotating twin screw extruder with L/D=52, whereby the throughput of the pigment is 2.4 kg/hr, and the throughput of the monomer/initiator mixture is 3.6 kg/hr.

The extruder barrel is divided into 13 zones, all having the same length and a transition flange (zone 14) and the die-head (zone 15) and each zone is heated individually. The following temperature profile is applied (1=input zone, 15=output zone):

zone 1 2 3 4 5 6 7 8 9 10 11 12 13 14 15 temperature (° C.) 40 40 40 75 110 120 130 140 150 150 150 135 135 160 180

The screw speed is 300 rpm. The melt is degassed in zone 12 at a pressure of about 5 mbar (absolute). The extrudate is collected in a container, broken and ground. The table below summarizes the results.

Example 8

Monomer Premixed with Chain Transfer Agent 10 kg of 1,4-diketo-3,6-di-(4-chlorophenyl)pyrrolo[3,4-c]pyrrol (IRGAZIN® DPP Red BTR from Ciba Specialty Chemicals) and 8 kg of a monomer/n-BuSH mixture (stored and stirred in a cooled dosing vessel, see above): consisting of 7.84 kg of a monomer mixture (methylmethacrylate (MMA)/styrene (S) with a weight ratio of 80:20 (MMA:S), premixed (stirring for 5 minutes) with 0.16 kg of n-BuSH) and 3 kg of a cooled (−10° C.) initiator mixture (TBPND and TBPEHC with a weight ratio of TBPND:TBPEHC=70:30) are metered into a co-rotating twin screw extruder (same as in example 7 and same extrusion parameters), whereby the throughput of the pigment is 2.4 kg/hr, the throughput of the monomer/n-BuSH mixture is 3.6 kg/hr and the throughput of the initiator mixture is 0.29 kg/hr. The table below summarizes the results.

Example 9

Monomer Premixed with Initiator and Chain Transfer Agent 10 kg of 1,4-diketo-3,6-di-(4-chlorophenyl)pyrrolo[3,4-c]pyrrol (IRGAZIN® DPP Red BTR from Ciba Specialty Chemicals) and 8 kg of a monomer/n-BuSH/initiator mixture (stored and stirred in a cooled dosing vessel, see above): consisting of 7.20 kg of a monomer mixture (methylmethacrylate (MMA)/styrene (S) with a weight ratio of 80:20 (MMA:S), premixed (stirring for 5 minutes) with 0.16 kg of n-BuSH and 0.64 kg of an initiator mixture (TBPND and TBPEHC with a weight ratio of TBPND:TBPEHC=70:30) are metered simultaneously into a co-rotating twin screw extruder (same as in example 7 and same extrusion parameters), whereby the throughput of the pigment is 2.4 kg/hr, the throughput of the monomer/n-BuSH/initiator mixture is 3.6 kg/hr. The table below summarizes the results.

Comparative Example 3

Separate Dosing 10 kg of 1,4-diketo-3,6-di-(4-chlorophenyl)pyrrolo[3,4-c]pyrrol (IRGAZIN® DPP Red BTR from Ciba Specialty Chemicals), 8 kg of a monomer mixture (methylmethacrylate (MMA)/styrene (S) with a weight ratio of 80:20 (MMA:S), 3 kg of an initiator mixture (TBPND and TBPEHC with a weight ratio of TBPND:TBPEHC=70:30) are metered separately but simultaneously into a co-rotating twin screw extruder (same as in example 7 and same extrusion parameters), whereby the throughput of the pigment is 2.4 kg/hr, the throughput of the monomer mixture is 3.6 kg/hr and the throughput of the initiator mixture is 0.29 kg/hr. The table below summarizes the results.

Example 10

Monomer Premixed with Initiator

Example 7 is repeated, but Daihan Blue 8700 is used instead of the IRGAZIN® pigment, further the temperature profile is as follows:

zone 1 2 3 4 5 6 7 8 9 10 11 12 13 14 15 temperature (° C.) 40 40 40 75 110 110 130 140 150 150 150 130 130 150 180

Example 11

Monomer Premixed with Chain Transfer Agent

Example 8 is repeated, but Daihan Blue 8700 is used instead of the IRGAZIN® pigment, further the temperature profile is the same as in example 10

Example 12

Monomer Premixed with Initiator and Chain Transfer Agent

Example 9 is repeated, but Daihan Blue 8700 is used instead of the IRGAZIN® pigment, further the temperature profile is the same as in example 10.

Comparative Example 4

Separate Dosing

Comparative example 3 is repeated, but Daihan Blue 8700 is used instead of the IRGAZIN® pigment, further the temperature profile is the same as in example 10.

Example 13

Monomer Premixed with Initiator 10 kg of HELIOGEN® Grün K8730 and 8 kg of a monomer/initiator mixture (stored and stirred in a cooled dosing vessel, see above): consisting of 7.52 kg of a monomer mixture (methylmethacrylate (MMA)/n-butylacrylate (BA)/acrylic acid (M) with a weight ratio of 50:30:20 (MMA:BA:M), premixed with 0.48 kg of an initiator mixture (TBPND and TBPEHC with a weight ratio of TBPND:TBPEHC=70:30) are metered into a co-rotating twin screw extruder with L/D=52, whereby the throughput of the pigment is 2.5 kg/hr, and the throughput of the monomer/initiator mixture is 2.5 kg/hr.

The extruder barrel is divided into 13 zones, all having the same length and a transition flange (zone 14) and the die-head (zone 15) and each zone is heated individually. The following temperature profile is applied (1=input zone, 15=output zone):

zone 1 2 3 4 5 6 7 8 9 10 11 12 13 14 15 temperature (° C.) 40 40 90 110 120 150 150 150 150 150 170 130 150 170 180

The screw speed is 250 rpm. The melt is degassed in zone 12 at a pressure of about 5 mbar (absolute). The extrudate is collected in a container, broken and ground. The table below summarizes the results.

Example 14

Monomer Premixed with Chain Transfer Agent 10 kg of HELIOGEN® Grün K8730 and 8 kg of a monomer/n-BuSH mixture (stored and stirred in a cooled dosing vessel, see above): consisting of 7.84 kg of a monomer mixture (methylmethacrylate (MMA)/n-butylacrylate (BA)/acrylic acid (M) with a weight ratio of 50:30:20 (MMA:BA:AA), premixed (stirring for 5 minutes) with 0.16 kg of n-BuSH) and 3 kg of a cooled (−10° C.) initiator mixture (TBPND and TBPEHC with a weight ratio of TBPND:TBPEHC=70:30) are metered into a co-rotating twin screw extruder (same as in example 13 and same extrusion parameters), whereby the throughput of the pigment is 2.5 kg/hr, the throughput of the monomer/n-BuSH mixture is 2.5 kg/hr and the throughput of the initiator mixture is 0.15 kg/hr. The table below summarizes the results.

Example 15

Monomer Premixed with Initiator and Chain Transfer Agent 10 kg of HELIOGEN® Grün K8730 and 8 kg of a monomer/n-BuSH/initiator mixture (stored and stirred in a cooled dosing vessel, see above): consisting of 7.36 kg of a monomer mixture (methylmethacrylate (MMA)/n-butylacrylate (BA)/acrylic acid (M) with a weight ratio of 50:30:20 (MMA:BA:AA), premixed (stirring for 5 minutes) with 0.16 kg of n-BuSH and 0.48 kg of an initiator mixture (TBPND and TBPEHC with a weight ratio of TBPND:TBPEHC=70:30) are metered simultaneously into a co-rotating twin screw extruder (same as in example 13 and same extrusion parameters), whereby the throughput of the pigment is 2.5 kg/hr, the throughput of the monomer/n-BuSH/initiator mixture is 2.5 kg/hr. The table below summarizes the results.

Comparative Example 5

Separate Dosing 10 kg of HELIOGEN® Grün K8730, 8 kg of a monomer mixture (methylmethacrylate (MMA)/n-butylacrylate (BA)/acrylic acid (AA) with a weight ratio of 50:30:20 (MMA:BA:AA) and 3 kg of an initiator mixture (TBPND and TBPEHC with a weight ratio of TBPND:TBPEHC=70:30) are metered separately but simultaneously into a co-rotating twin screw extruder (same as in example 13 and same extrusion parameters), whereby the throughput of the pigment is 2.5 kg/hr, the throughput of the monomer mixture is 2.5 kg/hr and the throughput of the initiator mixture is 0.15 kg/hr. The table below summarizes the results.

TABLE

Results of the Examples

| pigment | [BuSH] (%) | Mn (Daltons) | Mw (Daltons) | poly-disp. Mw/Mn |
|---|---|---|---|---|
| ex. 1 DPP Red BO | 0 | 7055 | 23741 | 3.37 |
| ex. 2 DPP Red BO | 2 | 8225 | 27957 | 3.40 |
| ex. 3 DPP Red BO | 2 | 4187 | 9714 | 2.32 |
| comp. ex. 1 DPP Red BO | 0 | 7999 | 29066 | 3.63 |
| [001b]ex. 4 HELIOGEN GRÜN | 0 | 8058 | 28068 | 3.48 |
| ex. 5 HELIOGEN GRÜN | 2 | 9560 | 33086 | 3.46 |
| ex. 6 HELIOGEN GRÜN | 2 | 5065 | 12653 | 2.50 |
| comp. ex. 2 HELIOGEN GRÜN | 0 | 9866 | 40330 | 4.09 |
| ex. 7 DPP Red BTR | 0 | 4106 | 11991 | 2.92 |
| ex. 8 DPP Red BTR | 2 | 3038 | 9094 | 2.99 |
| ex. 9 DPP Red BTR | 2 | 3656 | 10291 | 2.81 |
| comp. ex. 3 DPP Red BTR | 0 | 4509 | 13743 | 3.05 |
| ex. 10 Daihan Blue 8700 | 0 | 4087 | 12339 | 3.02 |
| ex. 11 Daihan Blue 8700 | 2 | 4650 | 14808 | 3.18 |
| ex. 12 Daihan Blue 8700 | 2 | 3668 | 11185 | 3.05 |
| comp. ex. 4 Daihan Blue 8700 | 0 | 4796 | 15655 | 3.26 |
| ex. 13 HELIOGEN GRÜN | 0 | 5535 | 26422 | 4.77 |
| ex. 14 HELIOGEN GRÜN | 2 | 3691 | 9203 | 2.49 |
| ex. 15 HELIOGEN GRÜN | 2 | 4957 | 13027 | 2.63 |
| comp. ex. 5 HELIOGEN GRÜN | 0 | 5887 | 34039 | 5.78 |

The results show decreasing molecular weights when premixing monomer and initiator, simultaneously the polydispersity is decreased. The same effect is observed when a chain transfer agent is used, but the monomer is not premixed with the initiator. If a mixture of monomer, initiator and chain transfer agent is used, usually the best results are achieved: i.e. low molecular weights, and a narrow molecular weight distribution, independently of the used pigment.

What is claimed is:

1. Process for preparing pigment preparations by mixing a dyestuff with a monomer and simultaneously polymerizing the monomers in an extruder at elevated temperatures, characterized in (A) introducing continuously into an extruder
 (a) from 40 to 90% by weight of a pigment,
 (b) from 60 to 10% by weight of a monomer or a monomer mixture, and
 (c) from 0.01 to 10% by weight, related to the amount of monomer component (b), of an initiator or a mixture of initiators, and
 (d) from 0 to 10% by weight, related to the amount of monomer component (b), of a chain transfer agent, whereby the amounts of the pigment and the monomer or monomer mixture sum up to 100%, and whereby the monomer component (b) is admixed with either the initiator or mixture of initiators (c), or the chain transfer agent (d), or the initiator or initiator mixture (c) and the chain transfer agent (d), before it is introduced into the extruder, (B) simultaneously mixing the components (a) to (c), as well as (d) if present, and polymerizing the monomer or copolymerizing monomer mixture within the extruder, and (C) withdrawing continuously the obtained reaction mixture from the extruder,
 wherein the monomer is or the monomers are selected from the group consisting of an acrylate or methacrylate of formula I $$CH_2=CR_1-COOR_2 \qquad (I)$$

wherein $R_1$ is hydrogen or methyl, and $R_2$ is hydrogen, $C_1$–$C_{12}$ alkyl, $CH_2$—$CH_2$—$N(R_3)(R_4)$, $CH_2$—$CH$=$CH_2$, $CH_2CF_3$, $CH_2$—$CH_2OR_3$, or $CH_2$—$CHOH$—$R_3$, $R_3$ and $R_4$ independently of each other are hydrogen or $C_1$–$C_4$ alkyl, acrylonitril, acrylamide, styrene, vinylacetate, and vinyl alcohol.

2. Process according to claim 1, characterized in using an acrylate monomer of formula I, wherein $R_1$ is hydrogen or methyl and $R_2$ is $C_1$–$C_4$ alkyl.

3. Process according to claim 1, characterized in selecting the initiator from the group consisting of tert.-butylperoxyneodecanoate, tert.-butylperoxyethylhexylcarbonate, tert.-amylperoxyneodecanoate, tert.-amylperoxypivalate, tert.-butylperoxypivalate, 2,5-d dimethyl-2,5-di(2-ethylhexanoylperoxy)hexane, tert.-amylperoxy-2-ethylhexanoate, tert.-butylperoxy-2-ethylhexanoate, and tert.-butylperoxy-3,5,5-trimethylhexanoate.

4. Process according to claim 1, characterized in using as pigment an organic pigment a quinacridone, diketopyrrolopyrrole, anthraquinone, perylene, indigo, quinophthalone, isoindolinone, isoindoline, dioxazine, phthalocyanine or azo series, or a mixture thereof.

5. Process according to claim 1, characterized in using as pigment an inorganic pigment a metal oxide pigment, a cadmium pigment, a chromate pigment, a molybdate pigment, or a mixture thereof.

* * * * *